United States Patent [19]

Lythgoe et al.

[11] 4,082,528
[45] Apr. 4, 1978

[54] GLASS MELTING TANK WITH TEMPERATURE CONTROL AND METHOD OF MELTING

[75] Inventors: Stanley Lythgoe, Parbold; David Gelder, Parbold, near Wigan, both of England

[73] Assignee: Pilkington Brothers Limited, St. Helens, England

[21] Appl. No.: 819,394

[22] Filed: Jul. 27, 1977

Related U.S. Application Data

[63] Continuation of Ser. No. 653,825, Jan. 30, 1976, abandoned.

[30] Foreign Application Priority Data

Jan. 31, 1975 United Kingdom .................. 4361/75

[51] Int. Cl.² .................................................. C03B 5/22
[52] U.S. Cl. ..................................... 65/135; 65/99 A; 65/182 R; 65/339; 65/346; 65/347
[58] Field of Search .............. 65/99 A, 136, 137, 339, 65/341, 346, 347, 356, 182 R, 135

[56] References Cited

U.S. PATENT DOCUMENTS

| | | | |
|---|---|---|---|
| 3,231,351 | 1/1966 | Brichard | 65/99 A X |
| 3,836,349 | 9/1974 | Knavish | 65/99 A X |
| 3,884,665 | 5/1975 | Edge et al. | 65/99 A |
| 3,930,826 | 1/1976 | Schornhorst | 65/99 A X |

*Primary Examiner*—Arthur D. Kellogg
*Attorney, Agent, or Firm*—Burns, Doane, Swecker & Mathis

[57] ABSTRACT

In the refining zone of a glass melting tank the molten glass is supported on a heat conducting base, such as molten tin, heat is removed from the glass through the base and the depth of glass, length of refining zone and temperature difference between the inlet and outlet of the zone are controlled so that the ratio of return flow to forward flow through the zone is between 1/6th and ½.

14 Claims, 1 Drawing Figure

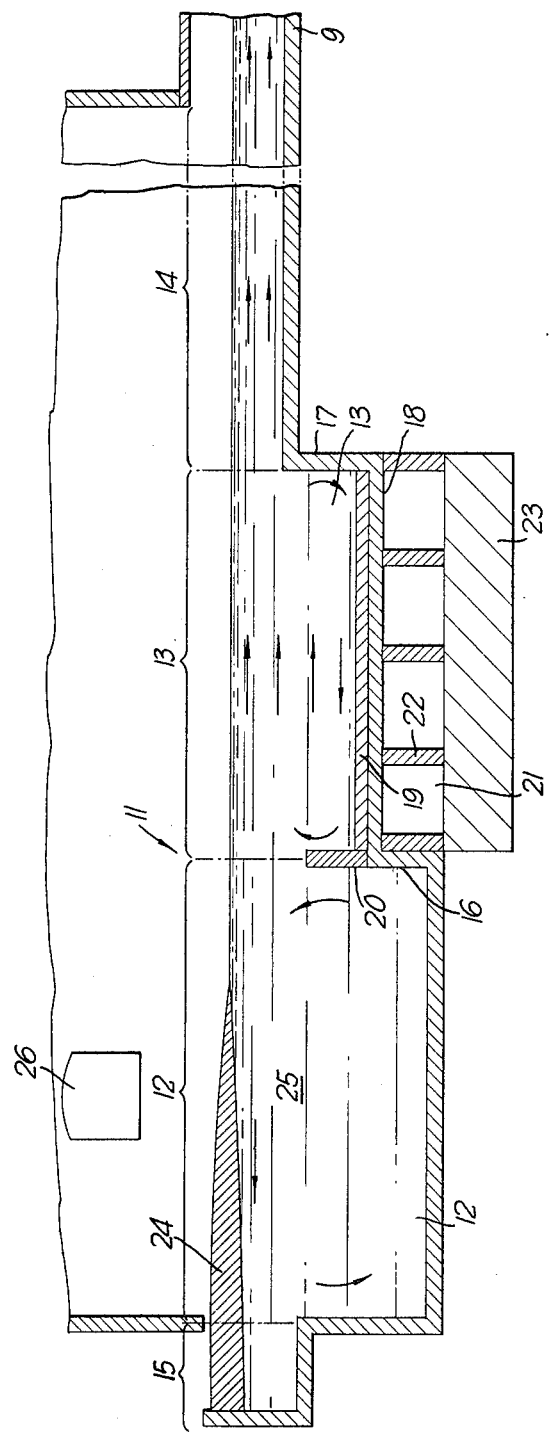

GLASS MELTING TANK WITH TEMPERATURE CONTROL AND METHOD OF MELTING

This is a continuation, of Application Ser. No. 653,825, filed Jan. 30, 1976 now abandoned.

BACKGROUND OF THE INVENTION

The present invention relates to glass melting and more particularly to a method of refining molten glass. The invention also relates to improved apparatus for use in refining molten glass.

In a known method of manufacturing glass in a continuous process, raw materials are fed in at one end of a glass melting tank to form a blanket floating on an existing bath of molten glass. The rate of feeding is sufficient to maintain a constant glass depth in the tank whilst molten glass progressively flows towards the opposite end of the tank known as the working end, from which molten glass is taken away for use in a forming process. The blanket of raw materials is converted to molten glass as it passes through a melting zone at one end of the tank by heat which may come for example from burning fuel supplied from burners situated at spaced intervals in the side walls above the glass level or from electrical heating devices. The molten glass passes from the melting zone into a refining zone where heat is also applied above the molten glass. In the refining zone bubbles of gas still remaining in the glass are encouraged to escape or go into solution in the glass. The glass passes from the refining zone into a conditioning zone adjacent the working end of the tank. In the conditioning zone the glass is homogenised and brought to a suitable thermal condition for use in the forming process. Normally a canal leads from the working end of the tank to a forming process.

To obtain glass free from gas bubbles and refractory corrosion products and to extend the life of the glass melting tank it is desirable to ensure that the glass in contact with the refractory is sufficiently cold. This is in part achieved by the convection flows set up in the molten glass within the tank, the flows causing glass to return from the colder to hotter areas in the lower sections of the tank. This can involve four or more times as much glass returning in the return flow within the tank as is being supplied to the forming process in the upper forward moving layers of molten glass. In this way additional heat is required to bring the return flowing glass to the temperature required in the forward flow.

SUMMARY OF THE INVENTION

It is an object of the present invention to provide an improved method of refining glass in which the ratio of forward flow to return flow in the refining zone is much larger than normal.

The present invention provides a method of refining molten glass in a refining zone of a tank containing molten glass, comprising supporting molten glass on a heat conducting support material forming the base of the refining zone, heating the upper regions of the molten glass so that the temperature of the upper region is sufficient to effect refining, removing heat from the lower region of the molten glass through said support material forming the base of the refining zone to minimise undesirable interaction with the support material, causing the upper regions of the glass to flow forwardly through the refining zone from an inlet to the zone towards an outlet from the zone with a small return flow in the lower regions of the glass, controlling the depth of glass in the zone, the length of the zone and the temperature difference between the glass at the inlet and outlet of the zone so that the ratio of return flow to forward flow is between 1/6th and ½.

In the case of normal flat glass compositions the temperature of the upper region of the glass may be at at least 1460° C and by use of the present invention the quantity of glass melt refined per unit area at that temperature is increased owing to the large proportion of forward flow through the refining zone. Furthermore, the glassleaves the refining zone having spent a controlled time being refined and as the quantity of glass circulating is less, the quality of the glass melt is improved as the quantity of glass coming into contact with refractory material in the refining zone is considerably reduced. This also means that a reduction in the refining area may be made e.g. by a reduction in the width of the known refiner, or an increase in output could be accommodated using the same tank.

It is preferable to maintain the return flow in the refining zone out of contact with refractory material at the base of the refining zone and preferably the molten glass is supported on a layer of molten metal at the base of the refining zone. Preferably the molten metal comprises tin. Other metals and alloys including alloys of tin can be used.

Although the ratio of return flow to forward flow may be varied, the preferred ratio is ¼.

Preferably heat is extracted from the bottom of the refining zone by circulating cooling air below the refining zone so as to maintain the molten metal where necessary at a temperature where it will not react with the glass.

The invention also provides a glass melting tank having a melting zone at one end of the tank into which glass forming materials are fed, a conditioning zone in which molten glass is brought to a desired thermal condition prior to discharge from the tank, a refining zone between the melting and conditioning zones, and means for applying heat to the upper surface of the glass in the melting and refining zones, the refining zone being provided with a layer of molten tin at the base of the tank on which the molten glass is supported, and cooling means located below the base of the tank adjacent the refining zone for removing heat from the lower region of molten glass in the refining zone.

Preferably refractory barriers are located at opposite ends of the refining zone, the barriers upstanding from the base of the refining zone so as to contain the molten tin solely within the refining zone.

Conveniently the cooling means comprises means for circulating cooling air below the refining zone.

The time necessary for satisfactory refining is to some extent dependent on the temperature at which refining is carried out. In the case of soda-lime-silica glass it is desirable to use a refining temperature of at least 1460° C. When using a refining temperature of 1460° C and above for the flow of glass leaving the refining zone, i.e. the load flow for the conditioning zone, one may need to maintain a minimum temperature differential between the surface of the glass melt and the interface between the glass melt and the molten metal of substantially 200° C. It is only the load flow of glass which will eventually enter the forming process which needs to reach the refining temperature, in this case 1460° C. This offers the facility to control the molten glass-/molten tin interface temperature at a value, dependent upon the chemical properties of the glass, at which the risk of significant interaction between the glass and metal is minimised. This temperature differential is achieved by providing cooling means below the refining zone to remove heat at the rates of the order of 30 Kws/sq.m.

The glass return flow within the refining zone recirculates at a relatively high temperature compared with previous proposals and this reduces the amount of reheating required when the glass again moves forward with the forward flow.

The amount of heat required in the refining operation in accordance with the present invention is reduced due to the reduction of quantity of glass in the return flow. The overall thermal efficiency is improved when the temperature, differential between the surface and the suppport material is minimised. The heat which is extracted from the base of the refining zone can be reused, for example by use in the regenerator chambers or for preheating batch material fed to the tank.

Preferably the melting zone of the tank is arranged to hold molten glass at a greater depth than the refining zone. In this way greater recirculation of molten glass may occur within the melting zone. It is also preferred that the melting end is provided with a filling pocket into which batch material is fed.

The raw materials may be fed in pellet form and may be preheated by hot gas. The pellets may be heated to about 700° C and fed onto the surface of the existing batch of molten glass by conventional means.

Preferably the conditioning zone is shallower than the refining zone and is preferably arranged so that the molten glass flow through the conditioning zone is entirely in the forward direction.

The present invention is also applicable to refining molten glass in an independent refining unit separate from the glass melting tank. In this case molten glass should be fed to the refiner in a substantially stone-free condition. The use of a refining unit independent of the melting unit means that it is possible to arrange the supply of molten glass from more than one source, thus enabling problems of operation and life arising in the melting unit to be solved without necessarily affecting the entire production. In the case of a conventional tank where melting zone, refining zone and conditioning zone are inter-related, a problem in one zone cannot be separated from the overall operation of the tank.

BRIEF DESCRIPTION OF THE DRAWING

The accompanying drawing shows a longitudinal section through a glass melting tank in accordance with the present invention.

DESCRIPTION OF THE PREFERRED EMBODIMENT

In this example a tank 11 has a melting zone 12, a refining zone 13 and a conditioning zone 14. The melting zone 12 has a filling pocket 15 at the melting end of the tank. The conditioning zone 14 leads to the working end of the tank from which conditioned glass is discharged to a canal 9 leading to a forming process. The tank is formed of refractory material and as is shown in the drawing, the base of the tank is stepped so that the melting zone provides the greatest depth of glass. The base of the tank has an upward step 16 at the downstream end of the melting zone so that the refining zone 13 is shallower than the melting zone. Similarly the downstream end of the refining zone has an upward step 17 so that the conditioning zone 14 is shallower than the refining zone. The base of the refining zone 13 is formed of a high heat conducting refractory 18 supporting a layer of molten tin 19 between the step 17 and an upstanding barrier 20 adjacent the inlet to the refining zone. Below the base 18 of the refining zone 13 is an air circulating system for circulating cooling air. This comprises a series of elongated apertures 21 between refractory supports 22. The supports 22 are mounted on a further refractory base 23.

In operation, glass forming material is fed into the pocket 15 in a conventional manner to form a blanket 24 lying on top of the molten glass 25. Heat is applied to the melting zone by gas burners mounted above the surface of the molten glass within the melting zone and operating through ports 26. The glass circulates, as shown by the arrows, in the melting zone so that there is a substantial return flow as well as forward flow. The molten glass progressively moves along the tank to the refining zone 13 and the conditions of operation in the refining zone are arranged such that the forward flow through the refining zone is substantially greater than the return flow, as is indicated by the arrows in the refining zone. The conditioning zone is shallow and operated so that all the glass in the conditioning zone 14 moves in the forward direction towards the working end of the tank, with no return flow.

The temperature of the upper region of the glass in the refining zone is at about 1460° C in order to carry out satisfactory refining. To prevent interaction between the molten glass and the tin in the refining zone, heat is extracted from the bottom of the refining zone in order to lower the temperature of the glass in contact with the molten tin. The temperature of the glass adjacent the tin can be of the order of 200° C below the temperature of the upper surface of the glass in the refining zone.

The cooling air which is circulated through the passages 21 below the refining zone extracts heat through the high conductivity refractory 18 and molten tin 19 and the extracted heat may be re-used by passing the cooling air to heat regenerators (not shown).

For a particular load, the ratio of forward to return flow within the refining zone 13 is dependent on the temperature differential between the glass entering the refining zone at its inlet and leaving the refining zone at its junction with the conditioning zone as well as the depth of glass within the refining zone and the length of the refining zone (that is the distance between the barrier 20 and the step 17). In this particular example the temperature difference between the inlet and outlet of the refining zone, the depth of the refining zone and the length of the refining zone is adjusted such that the ratio of return flow to forward flow is between 1/6th and ½. Preferably the ratio is ¼ as this provides maximum thermal efficiency. The choice of these conditions to attain a particular return flow is dependent on the original design of the tank. Such a design is best determined by a practical model work or by use of a theoretical computer model of the variables in the type of tank envisaged. In the practical operation of the tank, the final adjustment to control the return flow can be achieved by varying the temperature difference, and less desirably the glass depth by varying the tin depth in the refining zone. All the other variables are fixed by the design of the tank. The glass depth is normally of the order of two thirds of a meter and the length is as indicated above a function of the residence time needed for refining with a particular glass and the rate of flow of glass through the system. These factors are all determinable by the man practised in the art on the basis of his knowledge of the proposed operating load and the operating conditions of the tank.

Although in the above example the base of the refining zone is provided by molten tin, it may be possible in some cases to use other molten metals, including alloys, or even other refractory material provided it is capable of avoiding excessive interaction with the molten glass at the return flow temperature used in the refining zone.

The invention is not limited to the details of the foregoing example. For instance, the refining zone could be provided in a separate refining unit.

Although the example shown has one conditioning zone supplied by the refining and melting regions 13 and 12, it may be desirable in some cases to provide two or more conditioning canals which operate in parallel and are fed from a single melting or refining unit. It may in some cases be desirable when all three zones form a common unit to provide between each zone in the space above the glass a shadow wall or a barrier made of a platinum sheet to reduce or prevent free flow of the atmosphere from one space to the next.

We claim:

1. In a method of refining molten glass in a refining zone of a tank containing molten glass, which method comprises supporting molten glass on a heat conducting support material forming the base of the refining zone, heating the upper regions of the molten glass so that the temperature of the upper region is sufficient to effect refining, and enforcing flow of the glass such that the upper regions of the glass flow forwardly through the refining zone from an inlet to the refining zone towards an outlet from the refining zone while a colder return flow takes place in the lower regions of the glass in the refining zone, the improvement comprising establishing the depth of glass in the zone in relation to the length of the zone and the temperature difference between the glass at the inlet and outlet of the zone so that the ratio of return flow to forward flow is between 1/6th and ½; and removing heat from the lower region of the molten glass in the refining zone through said support material forming the base of the refining zone to minimize undesirable interaction of the molten glass with the support material.

2. The improvement according to claim 1 in which the return flow of molten glass in the refining zone is maintained out of contact with refractory material by the provision of a layer of molten metal at the base of the refining zone.

3. The improvement according to claim 2 in which the molten metal comprises tin.

4. The improvement according to claim 3 in which the ratio of return flow to forward flow in the refining zone is substantially ¼.

5. The improvement according to claim 1 in which heat is extracted from the bottom of the refining zone by circulating cooling air below the refining zone.

6. A glass melting tank having a melting zone at one end of the tank into which glass forming materials are fed, a conditioning zone in which molten glass is brought to a desired thermal condition prior to discharge from the tank, a refining zone with a refractory base between the melting and conditioning zones, and means for applying heat to the upper surface of the glass in the melting and refining zones, the refining zone being provided with a layer of molten metal at the base of the tank on which the molten glass is supported out of contact with said refractory base, and cooling means located below the base of the tank adjacent the refining zone for removing heat from the lower region of molten glass in the refining zone, said melting zone being arranged to hold molten glass at a greater depth than said refining zone and said conditioning zone being shallower than said refining zone and arranged so that molten glass flow through said conditioning zone is entirely in the forward direction.

7. A glass melting tank having a melting zone at one end of the tank into which glass forming materials are fed, a conditioning zone in which molten glass is brought to a desired thermal condition prior to discharge from the tank, a refining zone between the melting and conditioning zones, and means for applying heat to the upper surface of the glass in the melting and refining zones, the refining zone being provided with a layer of molten metal at the base of the tank on which the molten glass is supported, cooling means located below the base of the tank adjacent the refining zone for removing heat from the lower region of molten glass in the refining zone, and refractory barriers located at opposite ends of the refining zone and upstanding from the base of the refining zone so as to contain the molten metal solely within the refining zone.

8. A glass melting tank according to claim 6 wherein the molten metal is molten tin.

9. A glass melting tank according to claim 6 in which the cooling means comprises means for circulating cooling air below the refining zone.

10. A glass melting tank according to claim 6 in which the melting end is provided with a filling pocket together with means for feeding batch material into the filling pocket.

11. A glass melting tank according to claim 6 in which the outlet end of the conditioning zone communicates with a canal leading to a glass forming process.

12. A method of manufacturing molten glass comprising melting glass forming batch material in a melting zone of a glass melting tank, refining the molten glass by a method according to claim 1 and delivering the molten glass through a canal to a glass forming process.

13. In a method of refining molten glass in a refining zone of a tank containing molten glass, which method comprises supporting molten glass on a heat conducting support material forming the base of the refining zone, heating the upper regions of the molten glass so that the temperature of the upper region is sufficient to effect refining, and enforcing flow of the glass such that the upper regions of the glass flow forwardly through the refining zone from an inlet to the refining zone towards an outlet from the refining zone while a colder return flow takes place in the lower regions of the glass in the refining zone, the improvement comprising establishing the depth of the glass in the zone in relation to the length of the zone and the temperature difference between the glass at the inlet and outlet of the zone so that the ratio of return flow to forward flow is between 1/6th and ½; and removing heat from the lower region of the molten glass in the refining zone through a layer of molten metal comprising said support material forming the base of the refining zone to minimize undesirable interaction of the molten glass with the support material.

14. The method according to claim 13 wherein said molten metal comprises tin.

* * * * *